United States Patent
Kennedy et al.

(10) Patent No.: US 9,858,410 B2
(45) Date of Patent: Jan. 2, 2018

(54) TECHNIQUES FOR AUTOMATED APPLICATION ANALYSIS

(71) Applicant: Symantec Corporation, Mountain View, CA (US)

(72) Inventors: Mark Kennedy, Gardena, CA (US); Andrew B. Gardner, Roswell, GA (US); Vincent Cheong, Los Angeles, CA (US)

(73) Assignee: SYMANTEC CORPORATION, Mountain View, CA (US)

(*) Notice: Subject to any disclaimer, the term of this patent is extended or adjusted under 35 U.S.C. 154(b) by 71 days.

(21) Appl. No.: 14/922,952

(22) Filed: Oct. 26, 2015

(65) Prior Publication Data

US 2017/0116409 A1    Apr. 27, 2017

(51) Int. Cl.
| | |
|---|---|
| H04L 29/00 | (2006.01) |
| G06F 21/51 | (2013.01) |
| H04L 29/06 | (2006.01) |
| G06F 21/56 | (2013.01) |
| G06F 21/57 | (2013.01) |

(52) U.S. Cl.
CPC .............. *G06F 21/51* (2013.01); *G06F 21/56* (2013.01); *G06F 21/57* (2013.01); *H04L 63/1425* (2013.01); *H04L 63/20* (2013.01); *G06F 2221/033* (2013.01)

(58) Field of Classification Search
CPC ...... G06F 21/564; G06F 21/55; G06F 21/577; G06F 12/14; G06F 21/50; G06F 21/552; G06F 21/554; G06F 21/556; G06F 21/566; G06F 21/51
See application file for complete search history.

(56) References Cited

U.S. PATENT DOCUMENTS

| | | | |
|---|---|---|---|
| 2007/0261112 A1* | 11/2007 | Todd | G06F 21/577 726/11 |
| 2014/0082729 A1* | 3/2014 | Shim | G06F 21/51 726/23 |

* cited by examiner

*Primary Examiner* — Ghazal Shehni
(74) *Attorney, Agent, or Firm* — Maschoff Brennan (57) ABSTRACT

Techniques for automated application analysis are disclosed. In one embodiment, the techniques may be realized as a method comprising detecting a code creation activity; detecting the presence of a previously-unknown application; associating the detected application with the code creation activity; and permitting the application to run based on associating the detected application with the code creation activity.

20 Claims, 4 Drawing Sheets

TECHNIQUES FOR AUTOMATED APPLICATION ANALYSIS

FIELD OF THE DISCLOSURE

The present disclosure relates generally to application security and, more particularly, to techniques for automated application analysis.

BACKGROUND OF THE DISCLOSURE

Modern malware detection software includes advanced heuristics for analyzing unknown processes to identify and combat even novel malicious code. However, some individuals and businesses choose not to implement these tools because of the potential interference with proprietary code—that is, the company's internally developed tools and executables may be falsely flagged as malicious.

The malware detection framework may include a manual whitelisting process by which users can intentionally identify authorized programs, but often manual whitelisting is not used consistently. False positives for proprietary software can then cause users to disable malware analysis tools.

In view of the foregoing, it may be understood that there may be significant problems and shortcomings associated with current techniques for malware detection.

SUMMARY OF THE DISCLOSURE

Techniques for automated application analysis are disclosed. In one embodiment, the techniques may be realized as a method comprising detecting a code creation activity; detecting the presence of a previously-unknown application; associating the detected application with the code creation activity; and permitting the application to run based on associating the detected application with the code creation activity.

In accordance with other aspects of this embodiment, permitting the application to run further can require automatically adding the application to an application whitelist.

In accordance with further aspects of this embodiment, the method can further comprise detecting a second application; receiving from a remote client a status of the second application as being on a whitelist; and permitting the second application to run based on the received status.

In accordance with further aspects of this embodiment, the method can further comprise determining a scope for the application and transmitting the status of the application on the whitelist to one or more remote clients within the scope of the application.

In accordance with further aspects of this embodiment, permitting the application to run can further be based on matching the code creation activity to a plurality of parameters associated with a whitelisting policy.

In accordance with other aspects of this embodiment, the method can further comprise generating a reputation score for the application. The reputation score can be based on associating the detected application with the code creation activity. Permitting the application to run can be further based on the reputation score of the application exceeding a preset threshold value.

In accordance with other aspects of this embodiment, the code creation activity can be compiling an application. Associating the detected application with the code creation activity can comprise determining that the compiled application matches the detected application.

In accordance with another embodiment, the techniques may be realized as an article of manufacture including at least one processor readable storage medium and instructions stored on the at least one medium. The instructions may be configured to be readable from the at least one medium by at least one processor and thereby cause the at least one processor to operate so as to carry out any and all of the steps in the above-described method.

In accordance with another embodiment, the techniques may be realized as a system comprising one or more processors communicatively coupled to a network; wherein the one or more processors are configured to carry out any and all of the steps described with respect to any of the above embodiments.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Embodiments of the present disclosure are directed to an automated application analysis framework that identifies development activity by registered users and automatically whitelists proprietary software as it is developed and used. The system tracks the creation and dissemination of executable tools by a registered user under conditions recognized for internal tool development and automatically adds these tools to a whitelist within parameters set by an administrator. In some implementations, the system associates tool development activity with a reputation score, which may include many factors including the user's history and place in the company as well as the nature of the activity. The reputation score can then be used to determine whether executables are whitelisted, examined under normal heuristics, or prohibited within a particular.

Figure 1:
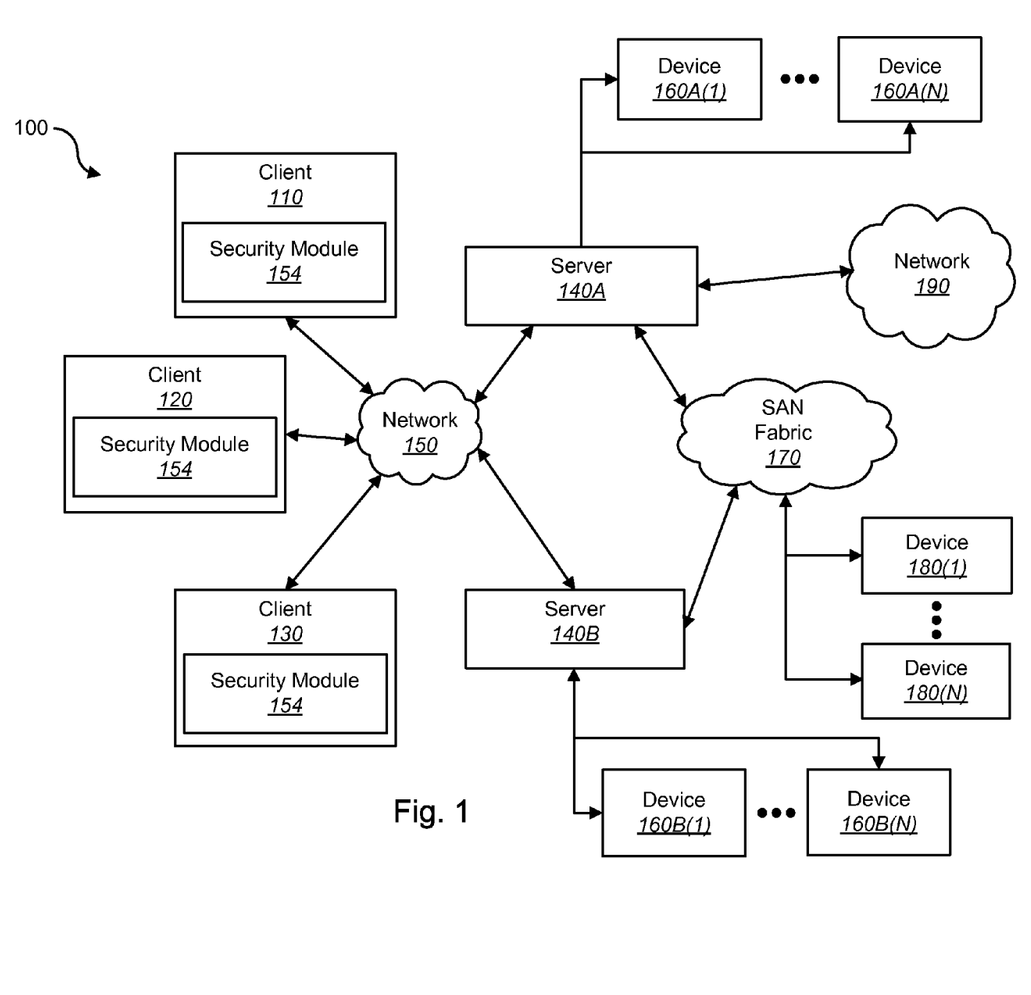
FIG. 1 shows a block diagram depicting a network architecture in accordance with an embodiment of the present disclosure.

FIG. 1 shows a block diagram depicting a network architecture 100 in accordance with an embodiment of the present disclosure. FIG. 1 is a simplified view of network architecture 100, which may include additional elements that are not depicted. Network architecture 100 may contain client systems 110, 120 and 130, as well as servers 140A-140N (one or more of each of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
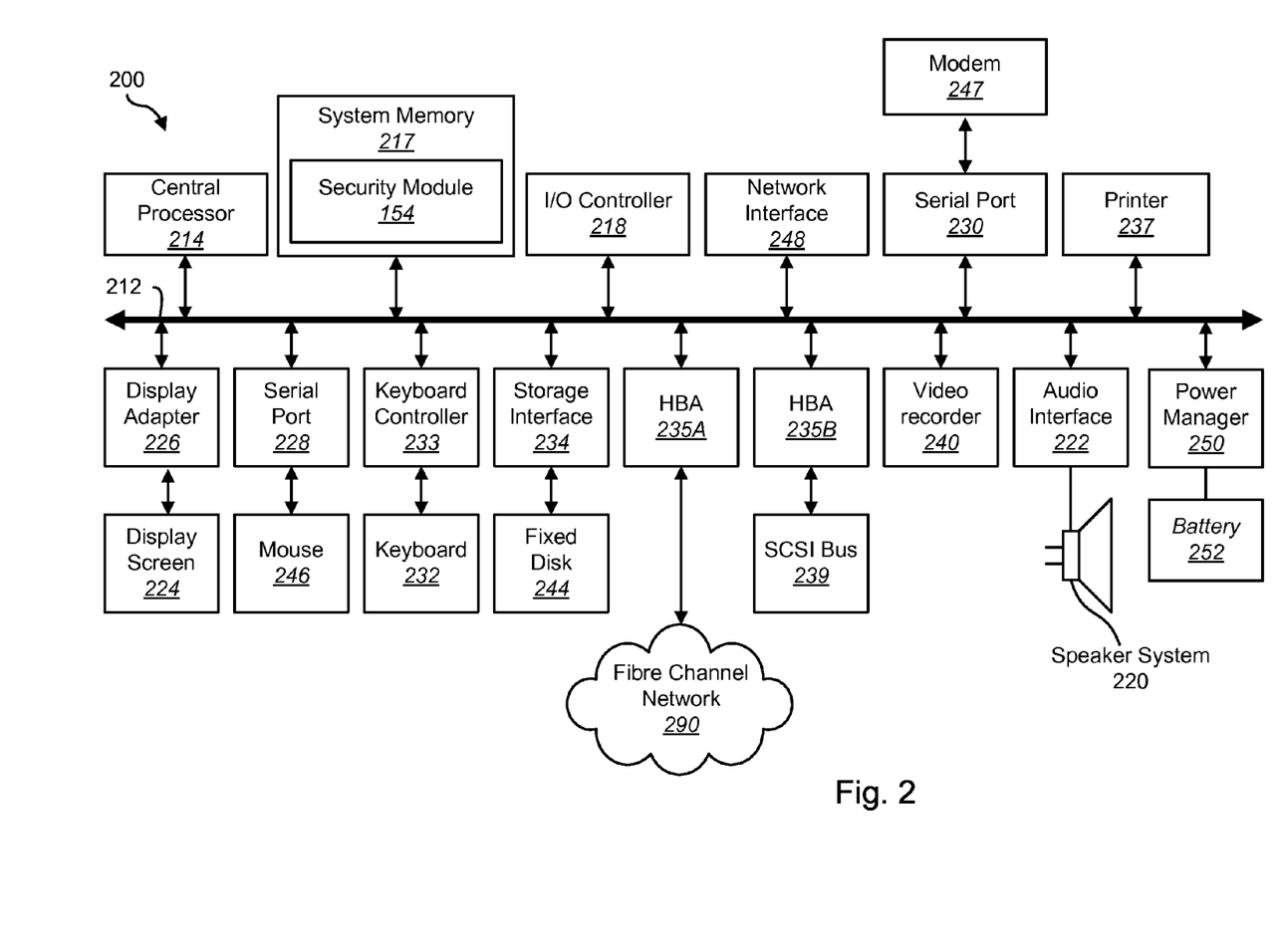
FIG. 2 shows a block diagram depicting a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes. Further, storage devices 160A(1)-(N), 160B(1)-(N), and/or 180(1)-(N) may be implemented as part of a multi-tier storage environment.

According to some embodiments, clients 110, 120, and 130 may be smartphones, PDAs, desktop computers, laptop computers, servers, other computers, or other devices coupled via a wireless or wired connection to network 150. Clients 110, 120, and 130 may receive data from user input, a database, a file, a web service, and/or an application programming interface. In some implementations, clients 110, 120, and 130 may specifically be network-capable mobile devices such as smartphones or tablets.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and 130 may contain one or more portions of software for system monitoring and protection such as, for example, security module 154. Components for coordination and control of the security modules 154 can reside at a network centric location such as server 140A. For example, server 140A may be a server, a firewall, a gateway, or other network element that may perform one or more actions to support management of system and network security elements. According to some embodiments, network 190 may be an external network (e.g., the Internet) and server 140A may be a gateway or firewall between one or more internal components and clients and the external network.

FIG. 2 shows a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a printer 237 operative to receive data and/or images for printing, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a printer 237, a removable disk unit (e.g., Universal Serial Bus drive), or other storage medium. According to some embodiments, a security module 154 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244 or optical disk 242. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
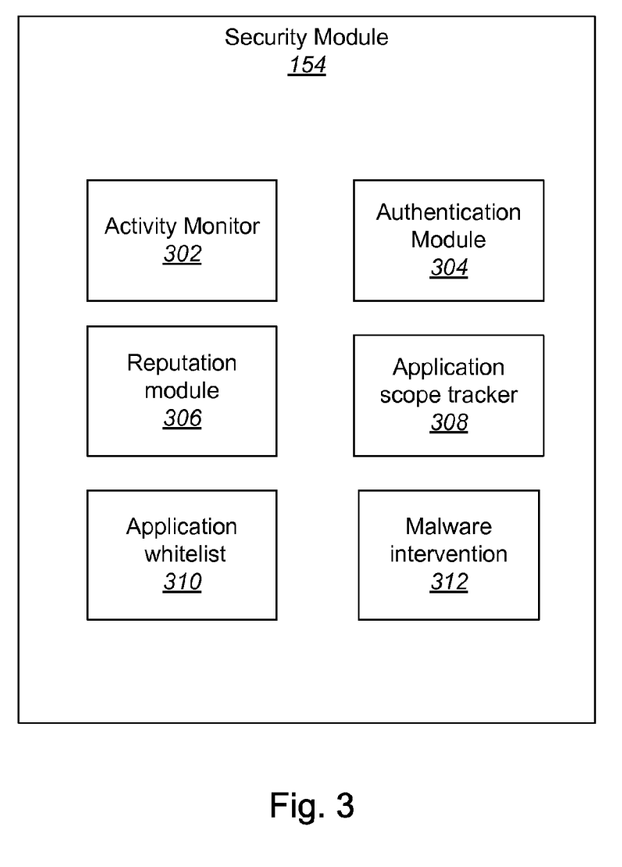
FIG. 3 shows a block diagram illustrating a security module in accordance with an embodiment of the present disclosure.

FIG. 3 illustrates an example of a security module 154 which may be disposed on end-user client systems for monitoring system activity and securing the system against malicious code. Although illustrated as modules on an end-user system, it will be understood that one or more of the illustrated modules may be embodied in whole or in part in a part of the system available over a network, and various functions illustrated herein may be managed centrally for a plurality of client systems.

The security module 154 may include an activity monitor 302 positioned identify actions taken by users of the client device and determine if those actions are associated with code creation. An authentication module 304 may include a mechanism for identifying users that are registered within the system, such as by linking to native authentication mechanisms within the system itself. Further, the authentication module 304 may confirm user registration to other modules within the security module 154 in order to associate various decisions and actions with the particular registered user.

A reputation module 306 is tasked with maintaining reputation scores for applications run on the client system. In some implementations, a variety of advanced heuristics may be involved in the generation of a reputation score, which may include the nature and pedigree of the application as well as a record of any expected or suspicious activity. Additionally, in embodiments of the present invention, the reputation score will also take into account any development activity logged by the activity monitor 302 and the identity of the registered user or users associated with that development activity in generating the reputation score.

In some implementations, a reputation score for an application that is shown to closely match that compiled by an authorized compiler application may be significantly higher. Matching the application to the code creation activity may include, in some implementations, comparing checksums, file sizes, and other information used in validating a genuine file.

Furthermore, in some implementations, a reputation score for an application may be significantly higher or lower based on a reputation score associated with the registered user that is identified as having introduced the application to the system. A user's reputation score may be based on a number of factors, including the user's previously recorded activity, the user's position within the organization associated with the system, the user's responsibilities (for instance, whether the user is employed by the organization as an IT professional and would be expected to develop tools for system support), custom settings provided by system administrators, the nature of the platforms and applications the user is associated with, and others.

A particular factor of note is that, if a user has previously been associated with one or more analyzed files which were determined to harbor malicious code, that user's reputation score and the score of further applications associated with that user may be lower as a result. Similarly, a user associated with applications that have later been confirmed to have been correctly deemed safe by the system may have a higher reputation score, as files from that user have been shown to be trustworthy.

In some implementations, a policy module 307 may provide another avenue for automated whitelisting of applications independent of the reputation score. An administrator or other user with the appropriate credentials may be able to specify one or more policies by which particular activities associated with generating proprietary tools may automatically result in whitelisting the resulting executables. For example, an administrator may specify a particular user, a particular computer system and platform, a particular application for creating the executable, a particular directory for the resulting executable, and a particular time frame during which the executable is produced. Any executable which is produced under the policy, including all of the parameters which the administrator has set, would be included on a whitelist. A further parameter may be scope of use—that is, the executable may be whitelisted only when detected on a particular set of specified systems but not when detected elsewhere in the system.

The policy module 307 as described may function independently of the reputation module 306, and it is understood that some systems may include automated whitelisting policies or reputation scores but not both. However, interaction between these mechanisms when they are both in use may also occur—for instance, code created outside the scope of the policies but including one or more parameters of the policies (such as code created with a policy-specified application by a policy-specified user, but on an unspecified system at an unspecified time) may in some implementations be given a higher reputation score due to the partial match. Alternatively, in some implementations, such an executable may be given a very low reputation score, as an executable created on an unapproved machine at an unapproved time may be symptomatic of a security breach. Machine learning and other heuristics may allow certain systems to extrapolate from explicitly-provided policies to other activity that is most likely also trustworthy.

An application scope tracker module 308 may be responsible for keeping track of how applications are distributed within a larger network associated with the system. In some implementations, application scope trackers 308 on other systems may communicate collectively to determine whether a particular application is deployed locally with a single machine, within a server hub, throughout a local network, across a customer website, or globally. In some implementations, the scope of an application may influence its reputation score. Activity associated with the intentional dissemination of a verified application may be taken as evidence that the application is authorized. Over time, widespread verified dissemination may be taken as de facto authorization within a network.

The security module 154 may include an application whitelist 310, which may include applications varying in scope from local to global for which high enough reputation scores have been generated for those applications to be deemed reliably safe. The whitelist 310 may include various information about executable and support files necessary to affirmatively identify an application, such as system registration data, file size and checksum information, names and typical file path information, and others. Application whitelists 310 can, in some implementations, be shared between modules across a system network or can be maintained and administered remotely from a central network location.

The security module 154 automatically adds applications to the whitelist 310 based on the scores generated by the reputation module 306 working with activity tracker 302 and authentication module 304. A variety of thresholds may be provided under certain circumstances and conditions; in some embodiments, an administrator-established or default threshold may be used and applications with reputation scores exceeding the established threshold may be automatically whitelisted for as long as that score is maintained.

The security module 154 can also include a malware intervention module 312 which may include any tools known in the art for cleaning, quarantining, disabling, and/or blocking malware. In some implementations, the malware intervention module 312 may, before intervening in the operation of a particular application, check the application against the whitelist 310. An application on the whitelist 310 may be automatically exempted from intervention by the module 312, or the system may inform an administrator or end user and require permission before intervening in a whitelisted application. In contrast, an application not found on the whitelist 310 may be more quickly acted upon by the malware intervention module 312 or with less alerts and permission required from a user. In some implementations, code given a reputation score that falls below an even lower threshold may simply be prohibited from being run altogether, or only run after an explicit warning and authorization by a user.

Figure 4:
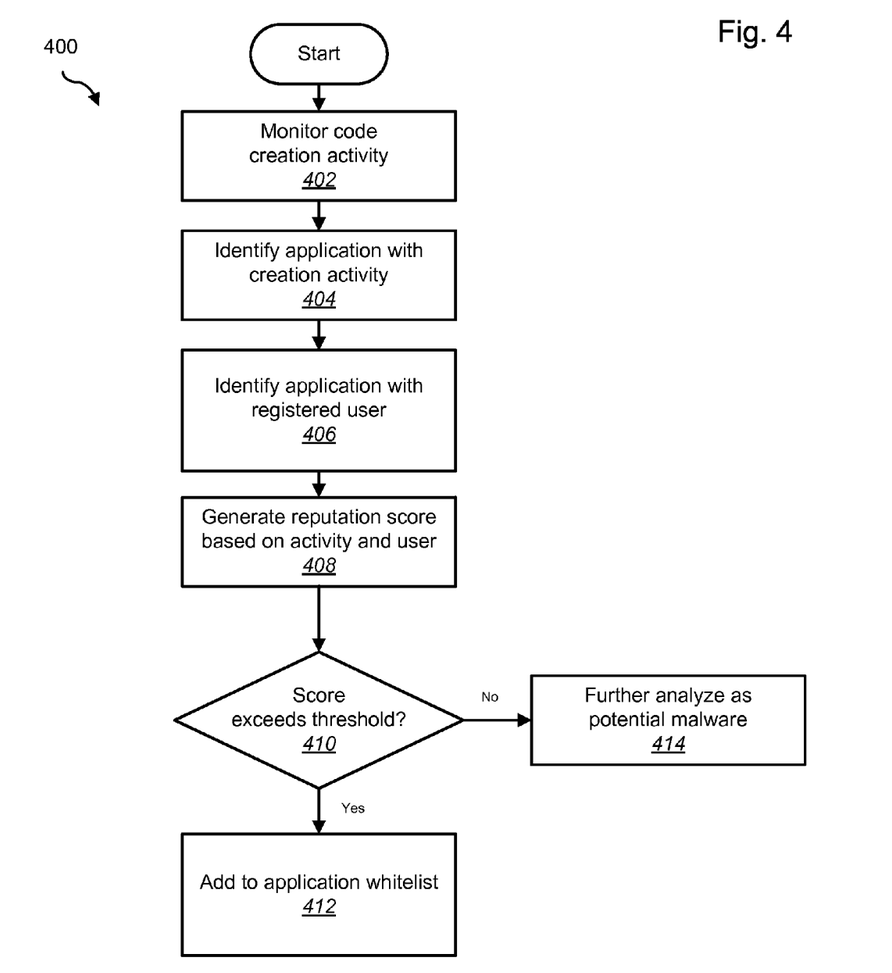
FIG. 4 shows a method for automated application analysis in accordance with an embodiment of the present disclosure.

FIG. 4 illustrates a method 400 for automated application analysis in accordance with some embodiments of the disclosure. It will be understood that a variety of methods are possible within the scope of what has been described, and the following method 400 is given for illustrative purposes only. The steps described may be performed by any appropriate system such as a security module 154 as described above.

The system monitors code creation activity (402). In some implementations, this may primarily involve identifying and monitoring applications capable of compiling code to generate executables. Other implementations may further involve monitoring editors, dissemblers, and other applications considered to be associated with code creation and modification in order to identify the creation of new, or newly-modified, applications which should not be falsely identified as malware.

When the system detects and analyzes a new, unknown application, if it matches an application generated by monitored creation activity, the application may be identified with that activity (404). It can then also be identified with a registered user associated with that same activity (406).

The system compares the creation activity associated with the application against the parameters included in one or more established whitelisting policies (408). If the code creation activity matches all of the established parameters, then the application is automatically whitelisted (410). As described above, the whitelisting of the application may vary in scope based on the specifics of the policy, the parameters of creation, or subsequent dissemination activity by the users. In some implementations, only users within an approved group may be allowed to run the executable without further scrutiny from the system.

In some implementations, when the code creation occurs outside of any established policy, automated whitelisting may still occur if the creation activity is assigned a high enough reputation score. Based on the specifics of the creation activity, the specifics of the registered user, the purported scope of the application, comparisons (including hash and metadata) between the application's file and a variety of records, and other analytics factors known in the art, the application is assigned a reputation score (412). As noted above, the reputation score may be influenced by a variety of factors, including settings provided by system administrators.

The reputation score is then compared against a threshold (414), which itself may be set according to a number of factors including administrator preference. If the reputation score is high enough, such as because the application was compiled by a trusted user working in IT, then the application is automatically added to a whitelist (416). An application that is not associated with as high of a reputation score may be analyzed further as potential malware (418) and not provided with any procedural exemptions granted by the whitelist.

At this point it should be noted that techniques for automated application analysis in accordance with the present disclosure as described above may involve the processing of input data and the generation of output data to some extent. This input data processing and output data generation may be implemented in hardware or software. For example, specific electronic components may be employed security modules or similar or related circuitry for implementing the functions associated with automated application analysis in accordance with the present disclosure as described above. Alternatively, one or more processors operating in accordance with instructions may implement the functions associated with automated application analysis in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A computer-implemented method for automated application analysis, the method being performed by a computing device comprising at least one processor, the method comprising:
   detecting, by the at least one processor, a code creation activity;
   detecting, by the at least one processor, the presence of a previously-unknown computer application;
   associating, by the at least one processor, the previously-unknown computer application with the code creation activity;
   generating, by the at least one processor, a reputation score for the previously-unknown computer application; and
   permitting, by the at least one processor, the previously-unknown computer application to run based on:
   (i) associating the previously-unknown computer application with the code creation activity, and
   (ii) the reputation score of the previously-unknown computer application exceeding a preset threshold value, wherein the reputation score of the previously-unknown computer application is partially based on at least one of recorded activities, a position, and responsibilities of a user, and wherein the user is identified as having introduced the previously-unknown computer application.

2. The method of claim 1, wherein permitting the previously-unknown computer application to run further requires automatically adding the previously-unknown computer application to an application whitelist.

3. The method of claim 2, further comprising:
   detecting a second computer application;
   receiving from a remote client a status of the second computer application as being on a whitelist; and
   permitting the second computer application to run based on the received status.

4. The method of claim 2, further comprising:
   determining a scope for the previously-unknown computer application: and
   transmitting the status of the previously-unknown computer application on the whitelist to one or more remote clients within the scope of the previously-unknown computer application.

5. The method of claim 1, wherein permitting the previously-unknown computer application to run is further based on matching the code creation activity to a plurality of parameters associated with a whitelisting policy.

6. The method of claim 1, further comprising:
   wherein the reputation score is based on associating the previously-unknown computer application with the code creation activity.

7. The method of claim 1,
   wherein the code creation activity is compiling a computer application; and
   wherein associating the previously-unknown computer application with the code creation activity comprises determining that the compiled computer application matches the previously-unknown computer application.

8. The method of claim 1, further comprising identifying the user by linking to a native authentication mechanism.

9. An article of manufacture for automated application analysis, comprising:
   at least one non-transitory processor readable storage medium; and
   instructions stored on the at least one medium;
   wherein the instructions are configured to be readable from the at least one medium by at least one processor and thereby cause the at least one processor to operate so as to:
   detect a code creation activity;
   detect the presence of a previously-unknown computer application;
   associate the previously-unknown computer application with the code creation activity;
   generating a reputation score for the previously-unknown computer application; and
   permit the previously-unknown computer application to run based on:
   (i) associating the previously-unknown computer application with the code creation activity, and
   (ii) the reputation score of the previously-unknown computer application exceeding a preset threshold value, wherein the reputation score of the previously-unknown computer application is partially based on at least one of recorded activities, a position, and responsibilities of a user, wherein the user is identified as having introduced the previously-unknown computer application.

10. The article of claim 9, wherein permitting the previously-unknown computer application to run further requires automatically adding the previously-unknown computer application to an application whitelist.

11. The article of claim 10, wherein the at least one processor is further operable to:
    detect a second computer application;
    receive from a remote client a status of the second computer application as being on a whitelist; and
    permit the second computer application to run based on the received status.

12. The article of claim 10, wherein the at least one processor is further operable to:
    determine a scope for the previously-unknown computer application: and
    transmit the status of the previously-unknown computer application on the whitelist to one or more remote clients within the scope of the previously-unknown computer application.

13. The article of claim 9, wherein permitting the previously-unknown computer application to run is further based on matching the code creation activity to a plurality of parameters associated with a whitelisting policy.

14. The article of claim 9, wherein the at least one processor is further operable to:
wherein the reputation score is based on associating the previously-unknown computer application with the code creation activity.

15. A system comprising:
one or more processors communicatively coupled to a network; wherein the one or more processors are configured to:
detect a code creation activity;
detect the presence of a previously-unknown computer application;
associate the previously-unknown computer application with the code creation activity;
generating a reputation score for the previously-unknown computer application; and
permit the previously-unknown computer application to run based on:
(i) associating the previously-unknown computer application with the code creation activity, and
(ii) the reputation score of the previously-unknown computer application exceeding a preset threshold value, wherein the reputation score of the previously-unknown computer application is partially based on at least one of recorded activities, a position, and responsibilities of a user, wherein the user is identified as having introduced the previously-unknown computer application.

16. The system of claim 15, wherein permitting the previously-unknown computer application to run further requires automatically adding the previously-unknown computer application to an application whitelist.

17. The system of claim 16, wherein the one or more processors are further configured to:
detect a second computer application;
receive from a remote client a status of the second computer application as being on a whitelist; and
permit the second computer application to run based on the received status.

18. The system of claim 16, wherein the one or more processors are further configured to:
determine a scope for the previously-unknown computer application: and
transmit the status of the previously-unknown computer application on the whitelist to one or more remote clients within the scope of the previously-unknown computer application.

19. The system of claim 15, wherein permitting the previously-unknown computer application to run is further based on matching the code creation activity to a plurality of parameters associated with a whitelisting policy.

20. The system of claim 15,
wherein the reputation score is based on associating the previously-unknown computer application with the code creation activity.

* * * * *